Jan. 14, 1941.　　　C. W. MOTT　　　2,228,530
ADJUSTING MECHANISM FOR IMPLEMENTS
Filed Jan. 19, 1939　　　3 Sheets-Sheet 1
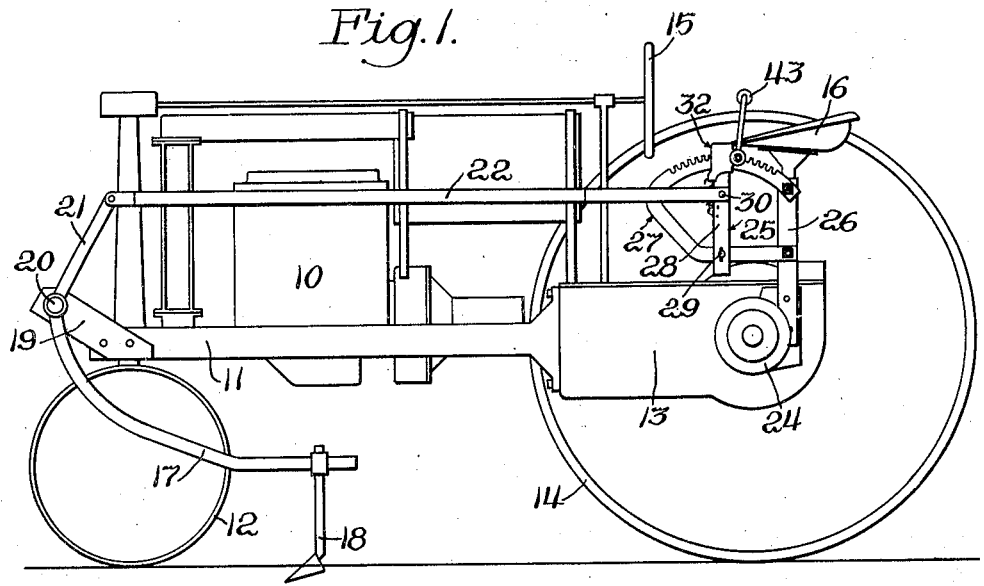
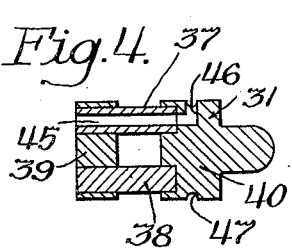
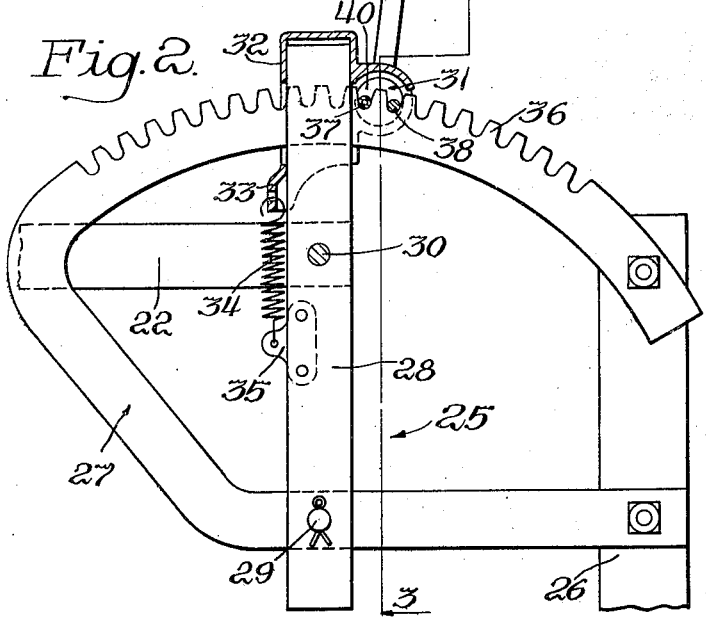
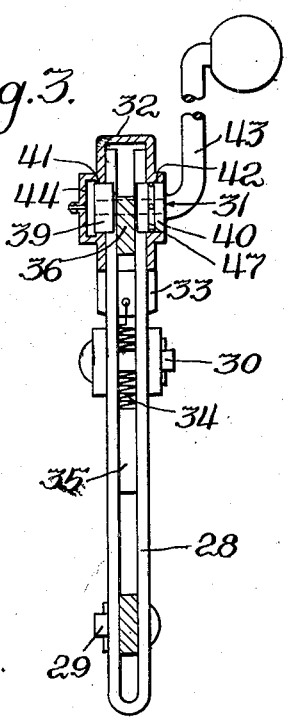
Inventor
Carl W. Mott
By [signature]
Att'y.

Jan. 14, 1941.  C. W. MOTT  2,228,530
ADJUSTING MECHANISM FOR IMPLEMENTS
Filed Jan. 19, 1939  3 Sheets-Sheet 2
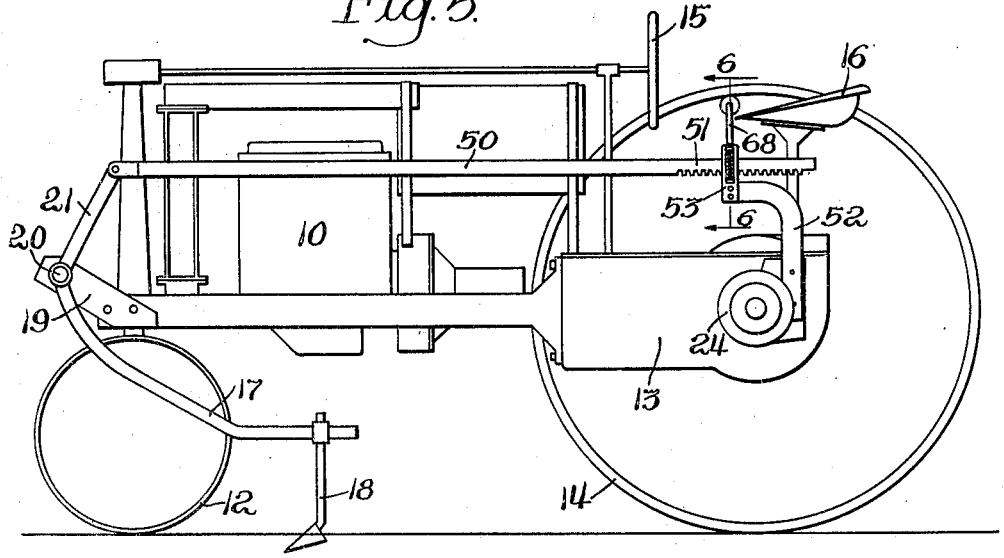
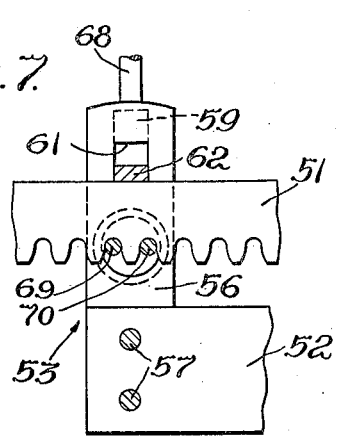
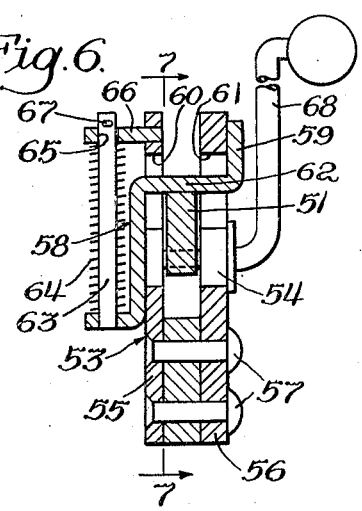
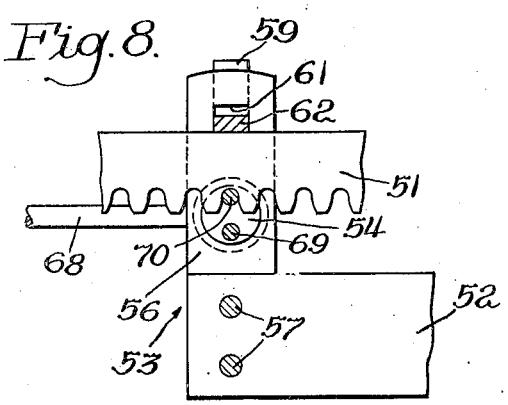
Inventor
Carl W. Mott
By I. F. Lassague
Att'y Jan. 14, 1941.  C. W. MOTT  2,228,530
ADJUSTING MECHANISM FOR IMPLEMENTS
Filed Jan. 19, 1939  3 Sheets-Sheet 3

Inventor
Carl W. Mott
By /S. Lavagne
Att'y.

Patented Jan. 14, 1941

2,228,530

UNITED STATES PATENT OFFICE 2,228,530

ADJUSTING MECHANISM FOR IMPLEMENTS

Carl W. Mott, La Grange, Ill., assignor to International Harvester Company, a corporation of New Jersey Application January 19, 1939, Serial No. 251,773

12 Claims. (Cl. 97—47)

This invention relates to adjusting mechanisms for use with agricultural implements. This invention has particular adaptability to implements mounted for adjustment on tractors where the adjusting mechanism is located in a position removed from the implement and near to the operator's station on the tractor.

An object of the invention is to provide an adjusting mechanism wherein the same does not get out of the range of the operator when seated on the operator's station.

Another object of the invention is to provide an adjusting mechanism wherein great lifting may be accomplished with minimum effort and without requiring great movement on the part of the operator.

It is another object of the invention to provide an adjusting mechanism which is self-locking and which will automatically remain in place, regardless of the direction in which it is moved, and which does not require a separate movement to unlock the mechanism prior to making adjustment thereof.

In accordance with this invention, there has been provided an adjusting mechanism with a self-locking rack and pinion in which the motion given to the adjusting lever is step by step, the mechanism locking itself at each half rotation of the manual means. The pinion has two diametrically opposite teeth-engaging portions spaced to permit the entrance of a tooth of the rack therebetween, so that the pinion will seat upon each half revolution and alinement of both teeth-engaging portions with adjacent rack spaces will take place. The motion required for the operation of the mechanism is that of rotation in a vertical plane near to the operator's station. A rack is provided, over which the pinion, when operated by the manual means, will travel, as shown by one of the forms of the invention, or the pinion member may be a stationary member and the rack may be caused to travel, as shown by another form of the invention. The locking of the rack and pinion is accomplished through a spring biasing means tending at all times to maintain the pinion and rack in locked relationship. As the pinion is operated, movement of this frame is permitted, or, in the second form, movement of the rack is permitted, so that the engaging portions of the pinion may slide out of teeth in the rack, so as to engage other teeth in the rack. Also, this rack and pinion arrangement can be used as the detent for the usual form of adjusting lever and provide therein, in addition to the adjusting lever, a means whereby step by step or vernier adjustments may be made more effectively when regulating the working depth of the implement. Also, in one form of the invention, adequate means is provided for the lubrication of the rack and pinion.

For other objects and for a better understanding of the invention reference may be had to the following detailed description taken in connection with the accompanying drawings, in which:

Figure 1 is an elevational view of a tractor having an implement mounted for adjustment thereon with which the adjusting mechanism of the present invention is connected;

Figure 2 is an enlarged view, partly in section, of the adjusting mechanism by itself, as shown in Figure 1;

Figure 3 is a view taken along the line 3—3 of Figure 2;

Figure 4 is a detail view in cross section of the pinion used in the present invention and illustrating its lubricating conduits;

Figure 5 is a view similar to Figure 1, showing a tractor with an implement attached and adjusting mechanism of a different form from that shown in Figures 1 to 4, inclusive;

Figure 6 is a cross sectional view in elevation taken along the lines 6—6 of Figure 5;

Figures 7 and 8 are similar views taken on the line 7—7 of Figure 6, but showing respectively different positions of the pinion relative to the rack; and, Figure 9 is another form of the invention, showing the self-locking rack and pinion mechanism being used as a detent for the usual adjusting lever.

Figure 9:
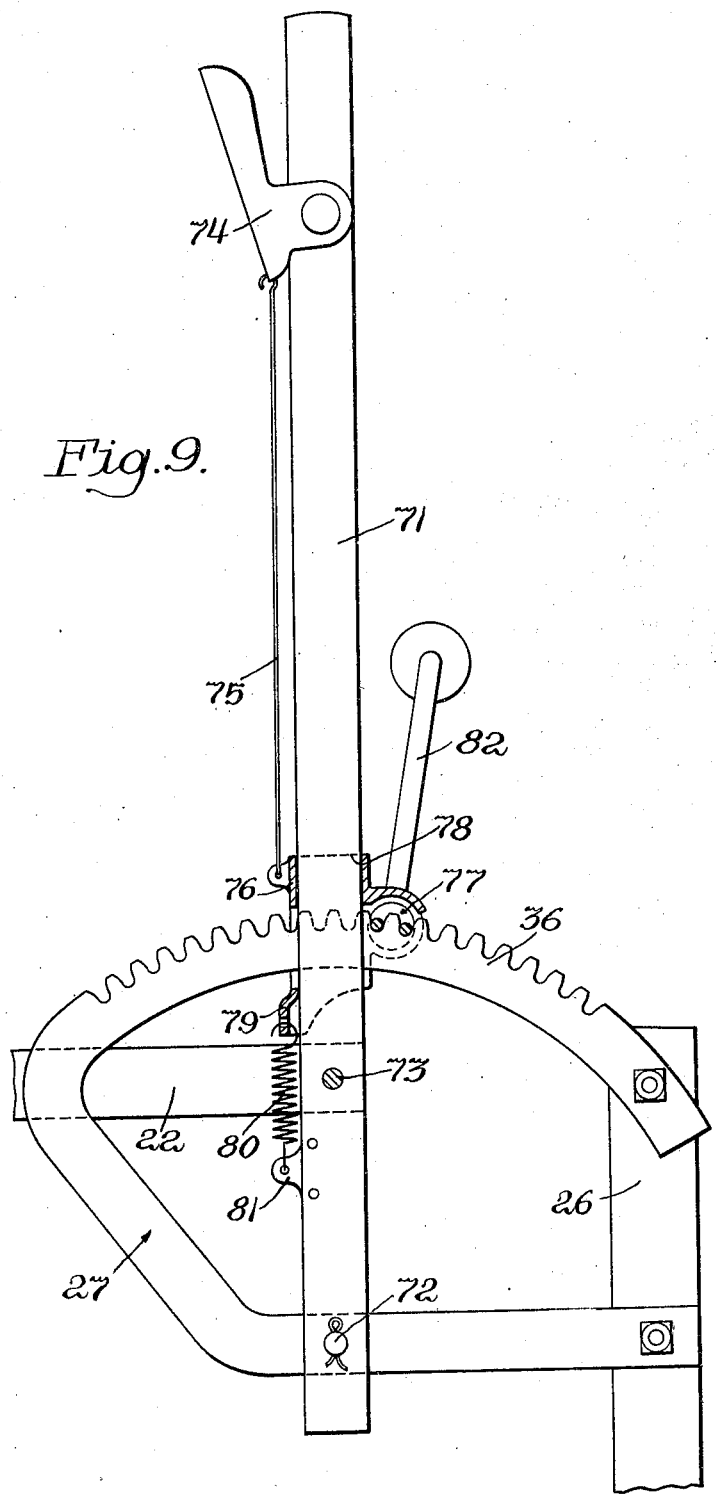

Referring now to the form in Figures 1 to 4, there is shown in Figure 1 a tractor indicated generally at 10, having a forward portion 11 supported by the usual steerable wheels 12 and a rear portion 13 supported by the usual traction wheels 14. The steerable wheels 12 are operated by means of a steering wheel 15 located near to an operator's station 16 on the rear portion 13 of the tractor. Mounted for vertical adjustment on the forward portion of the tractor is an implement 17 including a ground working tool 18 and other parts to be adjusted. The means for mounting this implement 17 includes forwardly extending brackets 19 fixed to the tractor, which carry a shaft 20 on which the implement 17 is pivotally mounted. The implement is adapted to be pivoted on the shaft 20 through a lifting arm 21, by means of a longitudinally extending lifting pipe or member 22 that extends rearwardly to a location at the rear of the tractor.

The rear portion of the tractor has the usual axle housing 24 to which the adjusting mechanism, designated generally at 25, may be fixed. This adjusting mechanism comprises a vertically extending bracket 26, to the upper end of which is rigidly connected a quadrant 27. On the quadrant there is provided a pivotal adjusting lever 28 pivoted at 29, to which the rear end of the lifting pipe 22 is pivotally connected at 30. On the upper end of this pivotal lever 28, there is provided a pinion 31, which, when coupled with the rack 27, provides the self-locking rack and pinion means which forms the essence of the present invention.

Referring now more particularly to Figures 2, 3 and 4, the coupling of the pinion and rack is shown more in detail. The pinion 31, which is shown on a larger scale in Figure 4, is supported in a frame structure 32 substantially of inverted cup shape, which fits down over the upper end of the lever 28. The pinion supporting frame 32 has a portion 33 at its lower end adapted for the attachment of a spring 34, the other end of which is connected to a bracket 35 on the lever 28. This spring is of such a character as to tend to hold the pinion frame and the pinion seated down, so that the pinion will tend to be held in locking engagement with the teeth or rack portion 36 of the quadrant 27. Referring more particularly to Figure 3, it will be seen that the lever 28 is of hair-pin shape and that it surrounds or nests the quadrant 27 and the rear end of the lifting pipe 22.

The pinion, as shown in Figure 4, includes two transversely extending engaging teeth portions 37 and 38 connected together diametrically opposite from each other by two spaced bearing portions 39 and 40. The engaging portions 37 and 38 are so spaced as to permit the entrance of a single tooth on the rack and to lie in adjacent spaces at the sides of the tooth when in locked engagement. The pinion is so mounted in its supporting frame that the bearing portions 39 and 40, respectively, fit in bearing portions 41 and 42 of the pinion supporting frame 32 and so that the transversely extending portions 37 and 38 fit in adjacent spaces of the rack teeth, Figure 2. This pinion has a manual operating means 43 fixed to it, so as to give it a rotative movement.

In order to provide adequate lubrication between the respective bearing portions of the pinion and its supporting frame, there is provided in the supporting frame 32 a pocket portion 44, into which lubricating fluid or material may be injected. This lubricating material is transferred to the bearings 40 and 42 from the pocket portion or means 44 through a passageway or passage means 45 in the transverse portions 37 of the pinion to the spaced bearing member 40, so it may pass radially outwardly through a radial passageway 46 and circumferentially about the bearing member 40 in a cylindrical groove 47.

In the operation of the adjusting mechanism, as the manual means 43 is rotated and the pinion 31 will be caused to travel along the rack portion 36 of the quadrant 27, one of the transverse portions 37 or 38 will serve to hold the lever 28 in position while the other transverse portion will be advanced to cause the lever 28 to take up a new position relative to the quadrant. As the engaging portions 37 and 38 are turned so that they are alined with adjacent spaces between a rack tooth, there is always a tendency, due to the biasing means, to retain them in these adjacent spaces and alined longitudinally with respect to the rack. The biasing means acts on the pinion in this manner on each half rotation thereof and, as the same approaches this alinement, the manual operating means, in fact, has a tendency to release itself from the operator's grasp. The pinion 31 being slidable or movable with respect to the lever 28, and the engaging portions 37 and 38 being diametrically spaced to permit entrance of a rack tooth, the pinion will seat itself well down into the rack, so that its center point is substantially below the top of the rack tooth, whereby a natural locking of the pinion is more or less effected independent of the biasing means, tending always to maintain the same in locked engagement. After each step, the adjusting lever is automatically locked by this self-locking rack and pinion means. The movement of the pinion over the rack is thus a positive step-by-step movement, the pinion locking itself with the rack at each step, the locking being so effective that any tendency of the lever, due to the weight of the implement, to unlock the pinion will be of no avail. This locking is effective in both directions with respect to the rack, and also it should be seen that a step-by-step adjustment can be effected in both movements of the lever forwardly and rearwardly with respect to the quadrant.

As the pinion is rotated in a counter-clockwise direction as viewed on the drawings, the lever 28 will pivot to the left, while, if the manual means 43 is rotated in a clockwise direction, the lever 28 will move to the right. This operation imparts a corresponding movement to the lifting pipe 22 and which, when moved forwardly on the tractor or to the left on the drawings, will effect lifting of the implement 17, or, if the movement is slight or but a single step, an adjustment tending to give less working depth to the tool 18 will be effected; whereas, movement of the lifting pipe 22 to the right or rearwardly, as accomplished by a clockwise motion of the manual means 43, will give greater working depth to the working tool 18. It should be noted at this time that the operator, when seated on the operator's station 16, is provided with an adjusting mechanism wherein the manual means is always within convenient reach of him, as distinguished from a large master lever, the handle of which moves through a great arc. Because of the well known mechanical advantage between a rack and pinion, it also should be seen that minimum effort will be required to effect the adjustment of the working implement. It also should be seen that rotative movement is given by the operator in a vertical plane extending longitudinally of the tractor and thus so located as to make for ease of manipulation.

Referring now to the form of the invention shown in Figures 5 to 8, there is shown a form wherein the pinion frame structure remains stationary and the rack member is the movable adjusting part. In Figure 5, there is shown a tractor similar to that shown in Figure 1, with the implement 17 including parts mounted thereon in the same manner as above described, but wherein there is a lifting pipe or member 50, the rear end of which has a rack portion 51 forming a part of the self-locking rack and pinion means. Connected to the rear axle housing on the rear portion of the tractor is an upstanding and forwardly extending bracket 52, on the forward end of which is fixed a pinion supporting frame structure 53 adapted to retain a pinion 54. This pinion supporting frame 53 is formed of two spaced parts 55 and 56 extending vertically from the forward end of the bracket 52 and rigidly connected thereto by means of rivets 57. The rack portion 51 of the lifting pipe 50 extends longitudinally between the spaced parts 55 and 56 and in operative engagement with the pinion 54.

Since in this form the pinion is not moved with relation to the rack, means must be provided for maintaining the rack down against the pinion 54. This is accomplished by means of a spring biasing means indicated generally at 58. This spring biasing means 58 comprises a vertically and transversely extending retaining member 59 adapted to lie along the side of the vertical part 55 and to extend through slots 60 and 61, respectively, in the parts 55 and 56. This member 59 has a transverse portion 62, which engages with the rack portion 51 of the lifting pipe 50. The member 59 has a vertically projected shaft 63, which receives a coil spring 64 and is slidable through an opening 65 in a laterally extending portion 66 fixed to the upper end of the part 55. This spring 64 is of such a character as to maintain the rack portion 51 always in engagement with the pinion 54. The member 59 is limited in its downward movement by means of a pin 67 in the upper end of the shaft 63 which is adapted to engage with the upper face of the laterally extending portion 66.

The pinion 54 has a manual actuating means 68 by which rotative movement may be given to it. The pinion 54 also includes two transversely extending portions 69 and 70 similar to those described above in connection with the form shown in Figures 1 to 4. With the pinion 54 in the position shown in Figure 7, the rack and pinion are in locked engagement. By turning the pinion one-quarter rotation to a position shown in Figure 8, one of the transverse portions 69 or 70, depending upon the direction in which the pinion has been rotated, will come out of engagement with the rack teeth and the rack is virtually lifted against the biasing spring 64 and is moved along. As the manual means 68 is turned another quarter rotation, the rack will be further moved along and the transverse portion, which happens to be out of engagement, will seat itself between adjacent teeth and immediately lock the mechanism and place the same ready for another half rotation of the pinion. In general, the locking in this form of the invention is effected the same as in the previous form by the deep seating of the two engaging portions of the pinion within the rack spaces.

Referring now to Figure 9, there is shown the use of the self-locking rack and pinion means as a detent or as a means for effecting a vernier adjustment of a quadrant and lever mechanism. This form is similar to the form shown in Figures 1 to 4, except that the lever is used for effecting a major adjustment or the lifting of the implement. On the vertical bracket 26, there is a similar quadrant 27 and a similar rack portion 36. Carried by the quadrant 27 is a master lever 71 pivoted at 72 and connected at 73 to the lifting pipe 22. This lever extends to a point well above the quadrant and has the usual hand detent releasing means 74 attached by means of a vertically extending link 75 to a supporting frame 76, which supports a pinion 77. This supporting frame 76 has an open top portion 78 and is slidable on the lever 71. Connected to a portion 79 at its lower end is a spring 80, which is in turn connected to a flange 81 on the lever 71. This spring tends to maintain the pinion 77 in locked engagement with the rack portion 36 of the quadrant 27.

When it is desired to make a major adjustment of the implement 17, the detent releasing means 74 is operated and the bracket frame 76 with the pinion 77 is taken out of engagement with the rack 36, and the lever 71 can then be moved forwardly or rearwardly, as desired by the operator. On the other hand, when only a slight depth regulating adjustment of the implement is desired, the pinion means 77 may be operated through its manual operating means 82. This manual operating means 82, when operated in a counter-clockwise direction, will effect a decrease in the working depth of the implement 18, and, when rotated in a clockwise direction, will effect an increase in the working depth of the implement 18.

It should now be seen that an adjusting mechanism has been provided which may be manipulated with minimum effort on the part of the operator and by which accurate and slight adjustments of the working depth of the implement are readily obtained.

While various changes may be made in the detailed construction of the forms of the invention herein shown, it shall be understood that such changes shall be within the spirit and scope of the appended claims.

What is claimed is:

1. In an adjusting mechanism, a quadrant including a rack portion, an adjusting lever pivoted on the quadrant and arranged to cooperate with the rack portion, a two-teeth pinion slidably carried by the lever to render the same free to travel over the rack, and means for rotating said pinion to adjust the lever.

2. In an adjusting mechanism, a quadrant including a rack portion, an adjusting lever arranged to cooperate with the rack portion, a pinion slidably carried by the lever and having two engaging portions adapted to operatively fit the rack portion, biasing means tending to hold the pinion and rack portion in locked engagement with each other, and means for rotating said pinion to effect travel over the rack portion whereby the lever will be adjusted relative to the quadrant.

3. In combination, a tractor, an agricultural implement mounted on the tractor and having a part thereof adapted for adjustment, a rack element, a slidably mounted pinion element having two engaging portions adapted to operatively fit the rack element, and biasing means tending to maintain the rack and pinion elements in locked engagement, one of the said elements arranged to move upon manipulation of said pinion element.

4. In an adjusting mechanism, a quadrant having a rack portion, an adjusting lever adapted to cooperate with said rack portion, a frame structure slidably carried by said lever, a pinion carried by the frame structure and having two engaging portions adapted to operatively fit said rack portion, biasing means for retaining the frame structure and tending to hold the engaging portions of the pinion and rack portion in locked engagement with each other, and means for rotating said pinion to effect travel over the rack portion.

5. In an adjusting mechanism, a quadrant having a rack portion, a manual adjusting lever adapted to cooperate with said rack portion, a frame structure slidably carried by said lever, a pinion carried by the frame structure and having two engaging portions adapted to operatively fit said rack portion, biasing means for retaining the frame structure and tending to hold the engaging portions of the pinion and the rack portion in locked engagement with each other, means for rotating said pinion to effect travel over the rack portion, and releasable means for holding the frame structure and pinion to overcome the effect of the biasing means to permit operation of the manual adjusting lever independently of the pinion and rack.

6. In an adjusting mechanism, a quadrant including a rack portion, a manual adjusting lever pivoted to cooperate with the rack portion of the quadrant, a pinion having two engaging portions adapted to operatively fit the rack portion, means for biasingly retaining said pinion in locked engagement with the rack portion, means for operating said pinion to effect adjustment of the lever, and means for releasing the biasing means and pinion to permit adjustment of the lever independently of the pinion and rack.

7. In an adjusting mechanism, a rack, a pinion cooperating with the rack to effect adjustment of one relative to the other and comprising spaced bearing portions and two teeth engaging portions extending transversely between bearing portions, a frame structure for carrying the pinion having bearing portions adapted to cooperate with said pinion bearing portions, a pocket means in the frame structure at one side of the pinion for the reception of lubricating fluid, and passage means through one of the engaging portions of the pinion for delivering lubricating fluid from the pocket to the bearing portions at the other side of the pinion, and means for operating the pinion to effect the adjustment between the pinion and the rack.

8. In combination, a tractor having a forward portion and a rear portion, an implement mounted for movement on the forward portion, a longitudinally extending lifting member connected to operate the implement and extending rearwardly along the tractor, a bracket on the rear portion of the tractor, a quadrant including a rack portion secured to the bracket, a lever pivoted on the bracket, a pinion slidably carried by the lever and adapted to operatively fit the rack portion, biasing means tending to hold the pinion and rack portion in locked engagement, said lifting member connected to said lever, and means for operating said pinion to effect movement of the lever on the rack whereby the implement is moved.

9. In an adjusting mechanism, a rack, a lever pivotally associated with said rack, a frame structure slidably mounted on said lever, a pinion journaled in said frame structure, means for rotating said pinion, and yieldable means connected to the lever and to the frame structure for holding the pinion in engagement with said rack.

10. In an adjusting mechanism, a rack, a lever pivotally associated with said rack, a frame structure having an opening for the reception of lubricating fluid slidably mounted on said lever, a pinion having openings therein for receiving lubricating fluid from said frame structure, said openings in the pinion directed towards the journal between the pinion and the frame structure for ejecting lubricating fluid thereto, means for rotating said pinion, and yieldable means connected to the lever and to the frame structure for holding the pinion in engagement with said rack.

11. In an adjusting mechanism, a rack, a lever associated with said rack, a supporting frame movably associated with said lever, a crank operated two-teeth pinion journaled in said supporting frame and adapted to operatively fit the rack, and means for yieldingly holding the pinion in engagement with said rack, whereby the lever can be adjusted with respect to said rack and the parts held in an assembled position.

12. In an adjusting mechanism, a rack, a support associated with said rack, a supporting frame movably associated with said support, a crank operated two-teeth pinion journaled in said support and adapted to operatively fit the rack, and means for yieldingly holding the pinion in engagement with said rack, whereby the lever can be adjusted with respect to said support and the parts held in an assembled position.

CARL W. MOTT.